(12) United States Patent
Iwahori et al.

(10) Patent No.: US 8,183,804 B2
(45) Date of Patent: May 22, 2012

(54) AC MOTOR DRIVING CIRCUIT AND ELECTRIC CAR DRIVING CIRCUIT

(75) Inventors: Michio Iwahori, Hino (JP); Masakazu Gekinozu, Matsumoto (JP)

(73) Assignee: Fuji Electric Co., Ltd., Kawasaki-Shi (JP)

( * ) Notice: Subject to any disclaimer, the term of this patent is extended or adjusted under 35 U.S.C. 154(b) by 410 days.

(21) Appl. No.: 12/588,890

(22) Filed: Oct. 30, 2009

(65) Prior Publication Data

US 2010/0109587 A1    May 6, 2010

(30) Foreign Application Priority Data

Oct. 30, 2008   (JP) ................. 2008-280068

(51) Int. Cl.
  *H02P 6/08*   (2006.01)
(52) U.S. Cl. ............... 318/400.09; 318/400.3; 318/800; 318/801; 318/148
(58) Field of Classification Search ............ 318/400.09, 318/400.3, 800, 801, 148, 139
See application file for complete search history.

(56) References Cited

U.S. PATENT DOCUMENTS 6,603,647 B2 *  8/2003  Briesen et al. ............... 361/91.1
2007/0274109 A1  11/2007  Oyobe et al.

FOREIGN PATENT DOCUMENTS

JP  2005-269805 A  9/2005
JP  2005-318731 A  11/2005

* cited by examiner

*Primary Examiner* — Walter Benson
*Assistant Examiner* — David Luo
(74) *Attorney, Agent, or Firm* — Rabin & Berdo, P.C.

(57) ABSTRACT

In an AC motor driving circuit from an AC power supply and a DC power supply, a matrix converter and a power conversion circuit are provided. The matrix converter is connected between an output of the AC power supply and an input of the AC motor. In the power conversion circuit, switches back-to-back connected to diodes, and bidirectional switches are series-connected, respectively. Connection junctions between the switches and the bidirectional switches are connected to the input phases of the AC motor, respectively. The other terminal of each switch is connected to one terminal of the DC power supply while the other terminal of each bidirectional switch is connected to the other terminal of the DC power supply. In this manner, the number of switches through which electric power passes at the time of operation is reduced so that loss can be reduced. Accordingly, power conversion efficiency can be improved.

16 Claims, 7 Drawing Sheets

AC MOTOR DRIVING CIRCUIT AND ELECTRIC CAR DRIVING CIRCUIT

This application claims priority from Japanese patent application serial number 2008-280068, filed on Oct. 30, 2008, hereby incorporated by reference herein.

BACKGROUND OF THE INVENTION

1. Field of the Invention

The present invention relates to an AC motor driving circuit which includes an AC power supply and a DC power supply capable of feeding and absorbing electric power and which drives an AC motor, and an electric car driving circuit using the AC motor driving circuit.

2. Description of the Related Art

For an AC motor driving circuit of this kind, there is previously known a circuit shown in FIG. 8 (e.g. JP-A-2005-318731).

The circuit uses a matrix converter 38 to achieve power conversion between motor generators MG1 and MG2. The matrix converter 38 is composed of nine switches arranged as a three by three switch matrix (switches SAa to SCc). A storage battery 12, a chopper 32 and a capacitor C2 form a DC power supply capable of feeding and absorbing electric power to the outside. A voltage source inverter 36 is provided to exchange electric power between the DC power supply and the motor generator MG2. The voltage source inverter 36 uses six arms, which have semiconductor switches Q31 to Q36 and diodes D31 to D36 back-to-back connected to the semiconductor switches Q31 to Q36 respectively. The six arms are composed of two U-phase bridge arms 36U, two V-phase bridge arms 36V, and two W-phase bridge arms 36W. The chopper 32 is formed of a reactor L and switching devices Q11 and Q12 paired with their respective corresponding diodes D11 and D12. A control apparatus 40 controls the AC motor driving circuit based on control signal from a controller 48.

For power conversion between the motor generators MG1 and MG2, the matrix converter 38 is operated and a switch S1 provided between the DC power supply and the voltage source inverter 36 is turned off. On the other hand, for use of both electric power from the DC power supply and electric power generated by the motor generator MG1 for driving the motor generator MG2, the on/off state of the switch S1 is controlled in a time division manner.

If an input line voltage of the motor generator MG2 exceeds an output voltage of the DC power supply in a period when the matrix converter 38 is operated to feed electric power from the motor generator MG1 to the motor generator MG2, a current flows into the DC power supply side from the motor generator MG2 side through the diodes D31 to D36 in the voltage source inverter 36. As a result, there is a possibility that the motor generator MG1 cannot perform desired drive control of the motor generator MG2. Therefore, the switch S1 is opened (turned off) in advance to avoid such a problem. On the other hand, a matrix converter for directly converting AC power into AC power with another frequency has been disclosed, for example, in JP-A-2005-269805.

In the circuit shown in FIG. 8, it is necessary to always apply a current to the switch S1 for power conversion between the DC power supply and the AC motor generator MG2. Hence, there is a problem that loss occurring due to the switch S1 results in lowering of efficiency in power conversion between the DC power supply and the AC motor generator MG2.

SUMMARY OF THE INVENTION

Therefore, an object of the invention is to reduce loss due to a switch to thereby prevent power conversion efficiency from being lowered.

In order to solve the foregoing problem, according to a first aspect of the invention described there is provided an AC motor driving circuit for driving an AC motor, having a matrix converter and a power conversion circuit, wherein the matrix converter is connected between an output of an AC power supply and an input of the AC motor; the power conversion circuit including series connection circuits which have switches back-to-back connected to diodes; series connection junctions between the switches and the first bidirectional switches are connected to the input phases of the AC motor, respectively; and the other terminal of each switch not connected to a corresponding first bidirectional switch is connected to one terminal of a DC power supply while the other terminal of each first bidirectional switch not connected to a corresponding switch is connected to the other terminal of the DC power supply.

As a second aspect of the invention, in the AC motor driving circuit, first bidirectional switches is provided so that the number of the series connection circuits is the same as the number of input phases of the AC motor. According to a third aspect of the invention, the AC motor driving circuit can be used as an electric car driving circuit, such that the AC power supply is an AC power generator driven by an internal combustion engine.

As a fourth aspect of the invention, the AC motor driving circuit can turn off the first bidirectional switches in the power conversion circuit when the matrix converter is operated. According to a fifth aspect of the invention, the AC motor driving circuit can further turn off second bidirectional switches when the power conversion circuit is operated, wherein the second bidirectional switches are included in the matrix converter and one terminal of each of the second bidirectional switches is connected to one of the input phases of the AC motor. In the AC motor driving circuit according to a sixth aspect of the invention, the DC power supply can be charged with electric power regenerated from the AC motor, while the second bidirectional switches in the matrix converter are turned off.

In the AC motor driving circuit according to a seventh aspect of the invention, a first period in which the matrix converter performs power conversion between the AC power supply and the AC motor and a second period in which the power conversion circuit performs power conversion between the DC power supply and the AC motor can be controlled in such a time division manner that the switches and the first bidirectional switches in the power conversion circuit are turned off during the first period while the second bidirectional switches in the matrix converter are turned off during the second period. According to an eighth aspect of the invention, the first period and second periods can be controlled using a PWM (Pulse Width Modulation) signal generating circuit.

According to the invention, a switch (e.g., S1 in FIG. 8) for preventing backflow from occurring at the operating time of the matrix converter can be dispensed with so that wiring for this portion can be shortened to thereby reduce wiring inductance. For this reason, it is possible to reduce a surge voltage, which is applied to the bidirectional switches and the switches in the power conversion circuit according to the present invention, when these switches are turned on/off, compared with the switches (e.g., Q31 to Q36 in FIG. 8) in the voltage source inverter (e.g., 36 in FIG. 8) according to the prior art. As a result, it is possible to reduce the size of a snubber circuit for snubbing the surge voltage.

More specifically, the invention has the following features (1) to (3).

(1) When the matrix converter is operated to perform power conversion between the AC power supply and the AC motor, the bidirectional switches in the power conversion circuit provided between the DC power supply and the AC motor are turned off. As a result, a current can be prevented from flowing from the AC motor into the DC power supply even when an input line voltage of the AC motor is higher than an output voltage of the DC power supply. Moreover, the power conversion circuit has the same configuration as that of the voltage source inverter in which switches back-to-back connected to diodes respectively and bidirectional switches are provided as arms respectively. Accordingly, when these arms perform switching in the same manner as in the voltage source inverter, power conversion can be made between the DC power supply and the AC motor. On this occasion, the switch (e.g., S1 in FIG. 8) used in the prior art can be dispensed with so that loss can be reduced to thereby improve conversion efficiency.

(2) The first period in which the matrix converter performs power conversion between the AC power supply and the AC motor and the second period in which the power conversion circuit performs power conversion between the DC power supply and the AC motor are controlled in a time division manner. As a result, the AC motor can be driven by both the electric power of the AC power supply and the electric power of the DC power supply. On this occasion, as described above, because the switches and the bidirectional switches in the power conversion circuit are turned off during the first period, a current can be prevented from flowing into the DC power supply even when an input line voltage of the AC motor exceeds an output voltage of the DC power supply. Similarly, because the bidirectional switches in the matrix converter are turned off during the second period, a current can be prevented from flowing into the AC power supply.

(3) In an electric car driving circuit for a hybrid car or the like, it is necessary to mount the circuit in a limited space. In this invention, because conversion efficiency between the DC power supply and the AC motor increases, a large output circuit can be mounted so that accelerating/decelerating performance of the electric car can be improved.

DETAILED DESCRIPTION OF THE INVENTION

Figure 1:
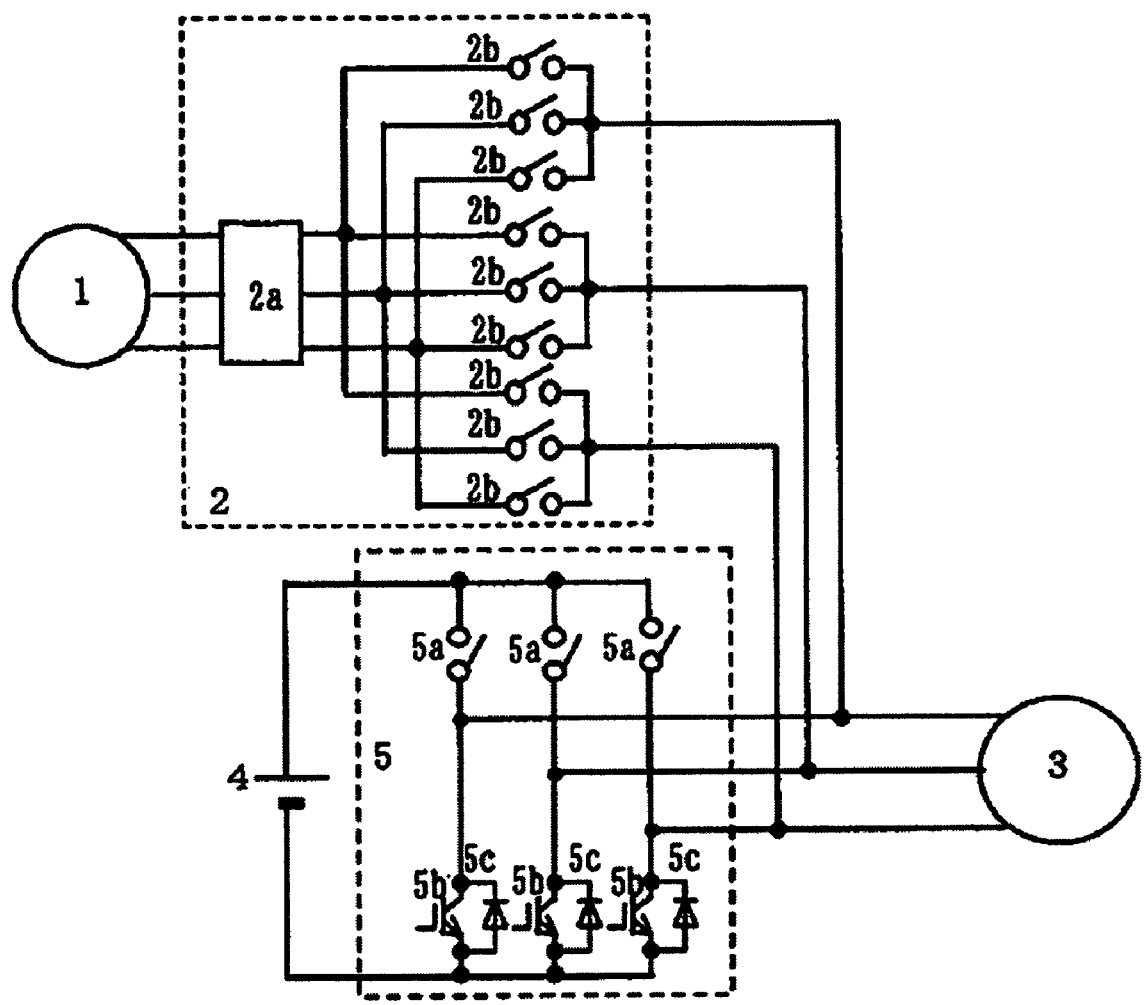
FIG. 1 is a circuit diagram showing an embodiment of the invention.

FIG. 1 is a configuration diagram showing an embodiment of the invention.

As shown in FIG. 1, in this embodiment, a matrix converter 2 is connected to an output of a three-phase AC power supply 1 so that an AC motor 3 is driven by an output of the matrix converter 2. The matrix converter 2 has a filter circuit 2a, and nine bidirectional switches 2b connected to an output of the filter circuit 2a. A storage battery 4 is used as a DC power supply capable of feeding and absorbing electric power to the outside. A power conversion circuit 5 is made of three circuits, which have unidirectional switches (hereinafter simply referred to as switches) 5b back-to-back connected to diodes 5c respectively, and bidirectional switches 5a series-connected to the switches 5b respectively. Series connection junctions between the switches 5b and the bidirectional switches 5a are connected to input phases of the AC motor 3, respectively. The other terminal of each bidirectional switch 5a is connected to a plus terminal of the storage battery 4 while the other terminal of each switch 5b is connected to a minus terminal of the storage battery 4. Incidentally, the storage battery 4 may be replaced by a capacitor.

With the aforementioned configuration, power conversion between an AC output of the AC power supply 1 and an AC input of the AC motor 3 can be performed by the matrix converter 2. The power conversion circuit 5 has the three bidirectional switches 5a, and the three switches 5b back-to-back connected to the diodes 5c. Assuming that each switch is regarded as one arm, then the power conversion circuit 5 has the same configuration as that of a voltage source inverter having six arms. For this reason, when the respective arms are switched in the same manner as in the voltage source inverter, power conversion between a DC output of the storage battery 4 and an AC input of the AC motor 3 can be achieved.

Figure 2:
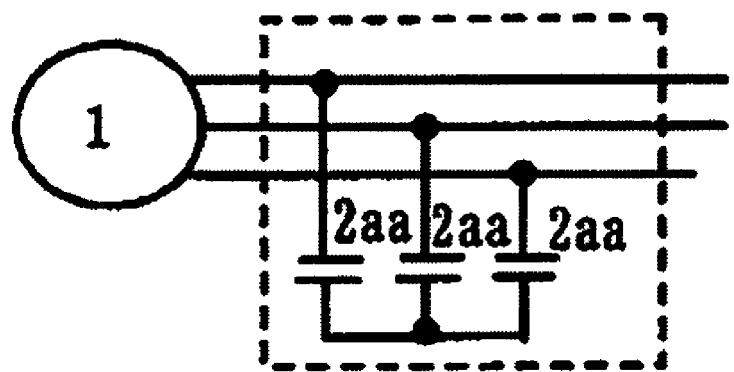
FIG. 2 is a circuit diagram showing a specific example of a filter circuit used in FIG. 1.
Figure 3:
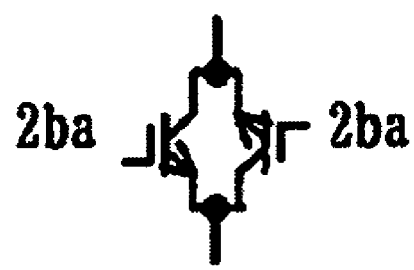
FIG. 3 is a circuit diagram showing a specific example of a bidirectional switch used in FIG. 1.

The filter circuit 2a shown in FIG. 1 can be achieved as an LC filter when inductance (not shown) is used and capacitors 2aa are star-connected as shown in FIG. 2. The bidirectional switches 2b and 5a can be formed, for example, as shown in FIG. 3 by using switching elements 2ba having reverse blocking capabilities in themselves. Incidentally, even when the order of connection of the series-connection circuits having the bidirectional switches 5a and the switches 5b back-to-back connected to the diodes 5c in the power conversion circuit 5 is changed as shown in FIG. 4, the function of the power conversion circuit 5 is unchanged.

Figure 4:
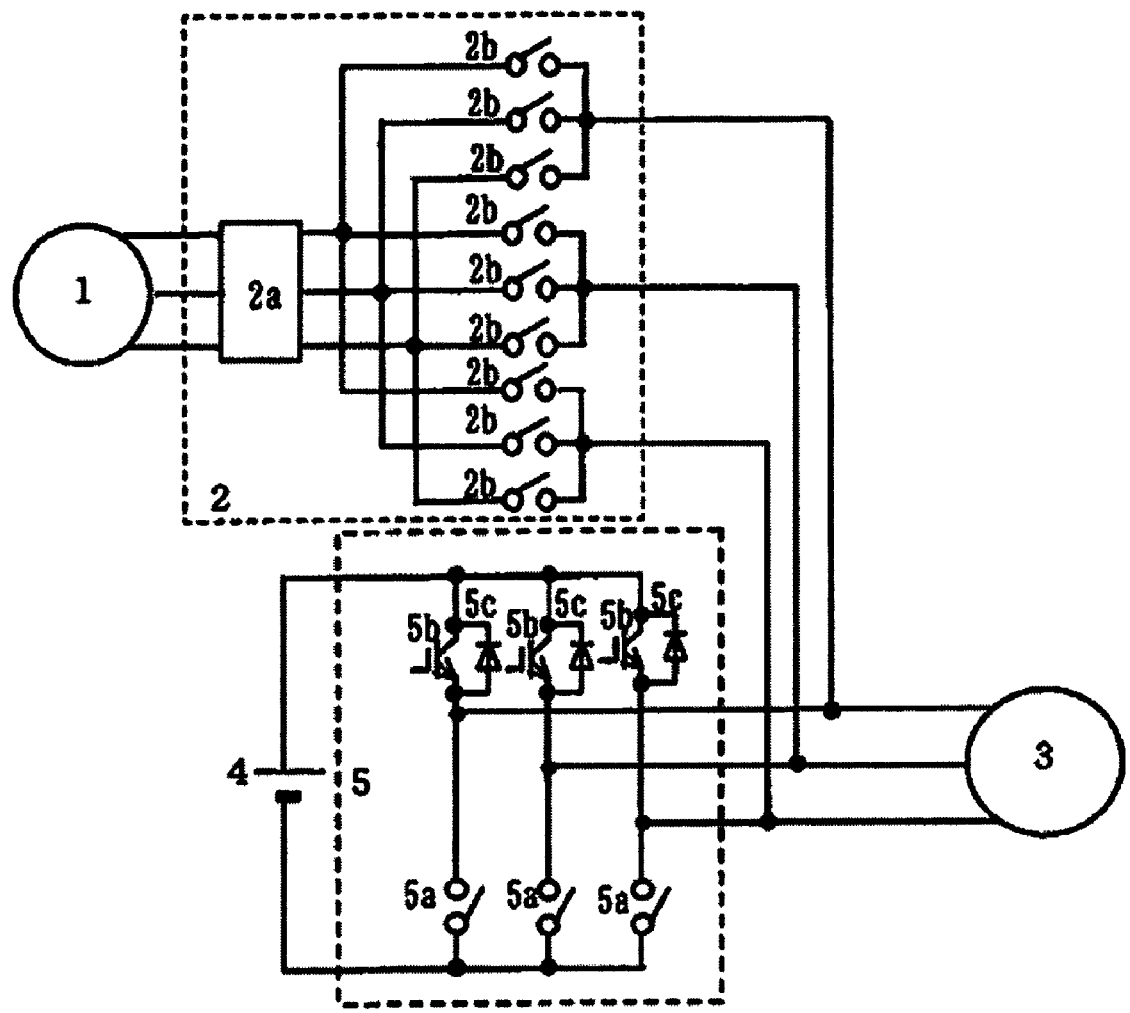
FIG. 4 is a circuit diagram showing a modified example of FIG. 1.

When all elements of the upper or lower arms in the power conversion circuit 5 are provided as the bidirectional switches 5a as shown in FIG. 1 or 4, a current can be prevented from flowing into the storage battery even if an output line voltage of the power conversion circuit 5 exceeds the voltage of the storage battery 4 at the operating time of the matrix converter 2.

Figure 5:
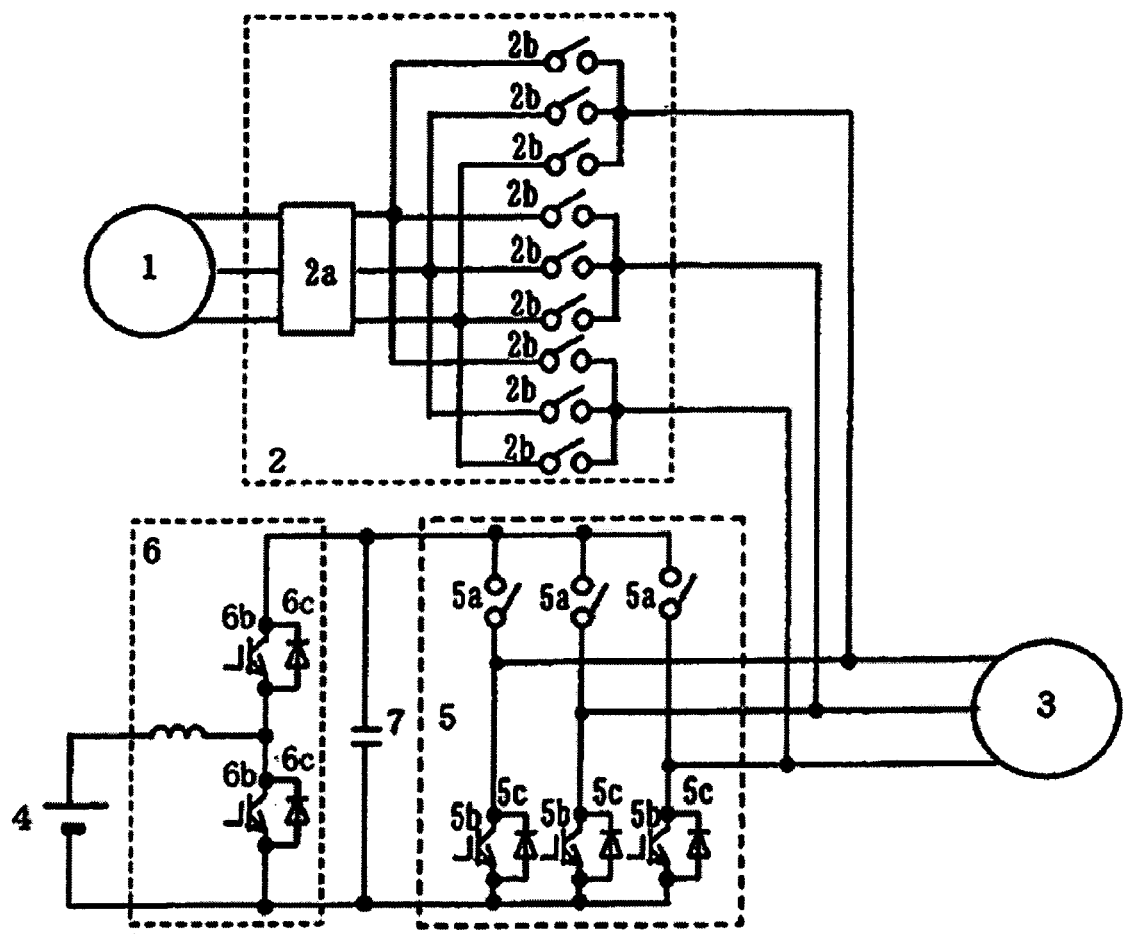
FIG. 5 is a circuit diagram showing another embodiment of the invention.

FIG. 5 shows a modified example of FIG. 1.

In the modified example, a chopper 6 and a capacitor 7 are connected between the storage battery 4 and the power conversion circuit 5. The chopper performs bidirectional power conversion in a direction of outputting electric power from the storage battery 4 to the power conversion circuit 5 and in a direction of charging the storage battery 4 with electric power from the power conversion circuit 5. In the configuration of the chopper 6 shown in FIG. 5, the chopper 6 performs a voltage boosting operation in the direction of outputting electric power from the storage battery 4 to the power conversion circuit 5 and performs a voltage dropping operation in the direction of charging the storage battery 4 with electric power froth the power conversion circuit 5. Switches 6b back-to-back connected to diodes 6c may be used as switching elements which are constituent parts of the chopper 6. The remaining configuration is the same as that in FIG. 1. As described above, it is a matter of course that a storage battery or a capacitor can be used as a DC power supply, and it is to be understood that a battery or the like may be connected through such a bidirectional power conversion circuit.

Figure 6:
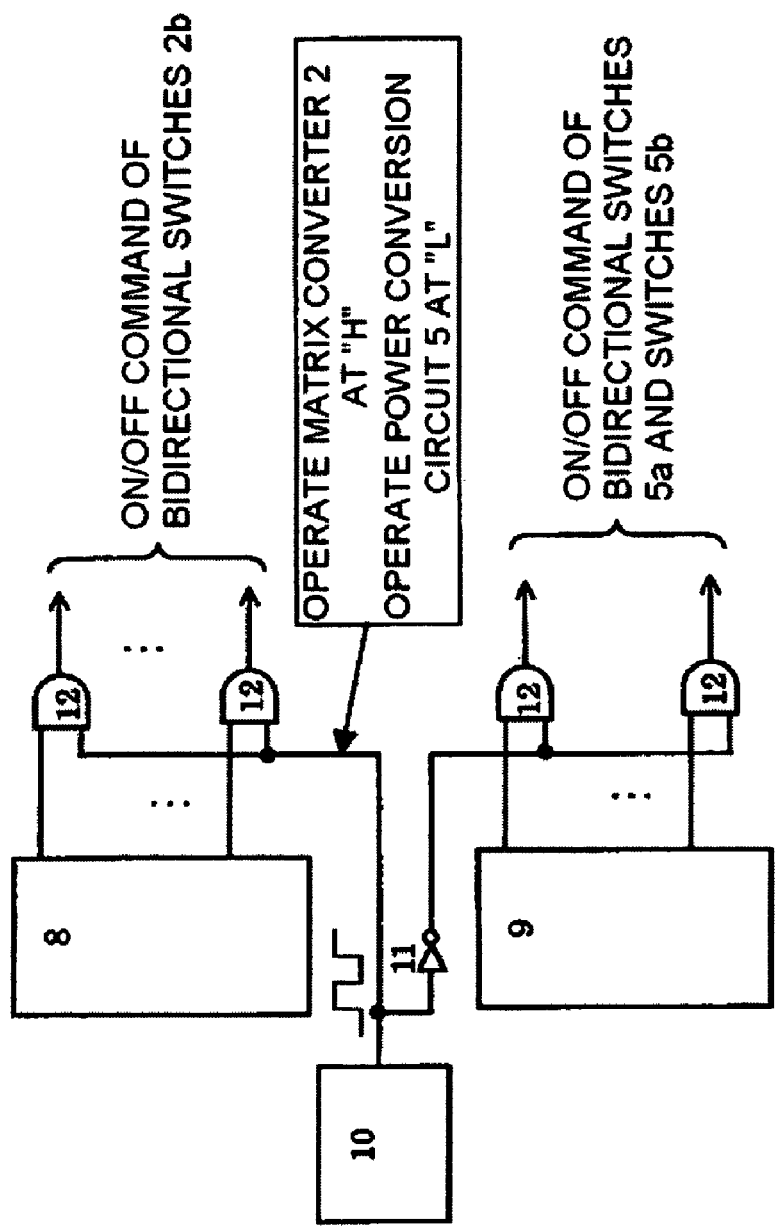
FIG. 6 is an explanatory view for explaining a control method according to the invention.

FIG. 6 is a diagram for explaining a control method according to the invention.

This control method is provided to generate a period for operating the matrix converter 2 (in FIGS. 1-5) and a period for operating the power conversion circuit 5 (in FIGS. 1-5) in a time division manner. A time division command generator 10 is used for this purpose. This control method is designed so that the matrix converter 2 (in FIGS. 1-5) is operated when an output signal of the time division command generator 10 is "H (High)" while the power conversion circuit 5 (in FIGS. 1-5) is operated when the output signal of the time division command generator 10 is "L (Low)".

A PWM (Pulse Width Modulation) signal generating circuit 8 generates a PWM signal for operating the matrix converter 2 (in FIGS. 1-5) to thereby issue an on/off command (on at "H" and off at "L") to each bidirectional switch 2b (in FIGS. 1-5) of the matrix converter 2 (in FIGS. 1-5).

Another PWM (Pulse Width Modulation) signal generating circuit 9 generates a PWM signal in the same manner as that in an ordinary voltage source inverter. A NOT circuit 11 inverts an output signal of the time division command generator 10. AND circuits 12 perform the logical product of the signal output from the PWM signal generating circuit 9 and the inverted signal output from the NOT circuit 11 to thereby issue an on/off command to the switches 5b (in FIGS. 1-5) and the bidirectional switches 5a (in FIGS. 1-5) in the power conversion circuit 5 (in FIGS. 1-5).

As described above, in FIGS. 1-5, the period for operating the matrix converter 2 and the period for operating the power conversion circuit 5 are controlled in a time division manner. During the period for operating the matrix converter 2, the switches 5b and the bidirectional switches 5a in the power conversion circuit 5 are turned off. On the other hand, during the period for operating the power conversion circuit 5, the bidirectional switches 2b in the matrix converter 2 are turned off.

Figure 7:
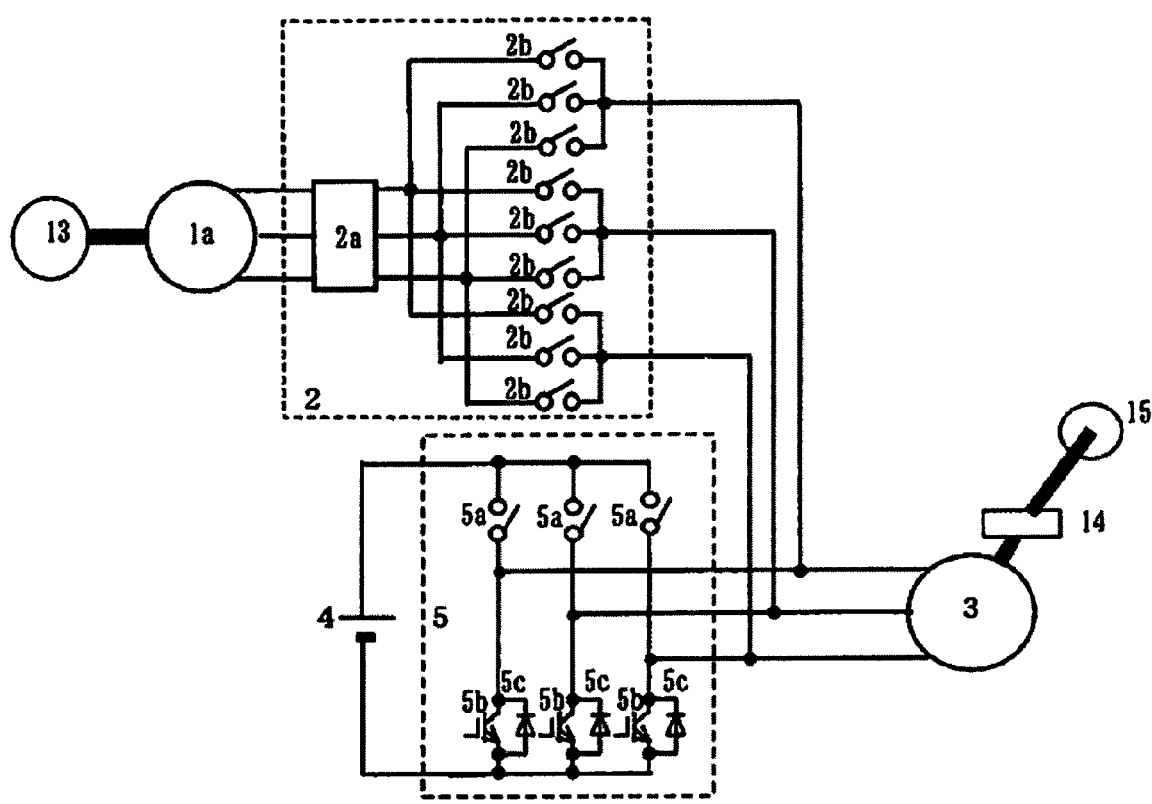
FIG. 7 is a circuit diagram showing an applied example of FIG. 1.
Figure 8:
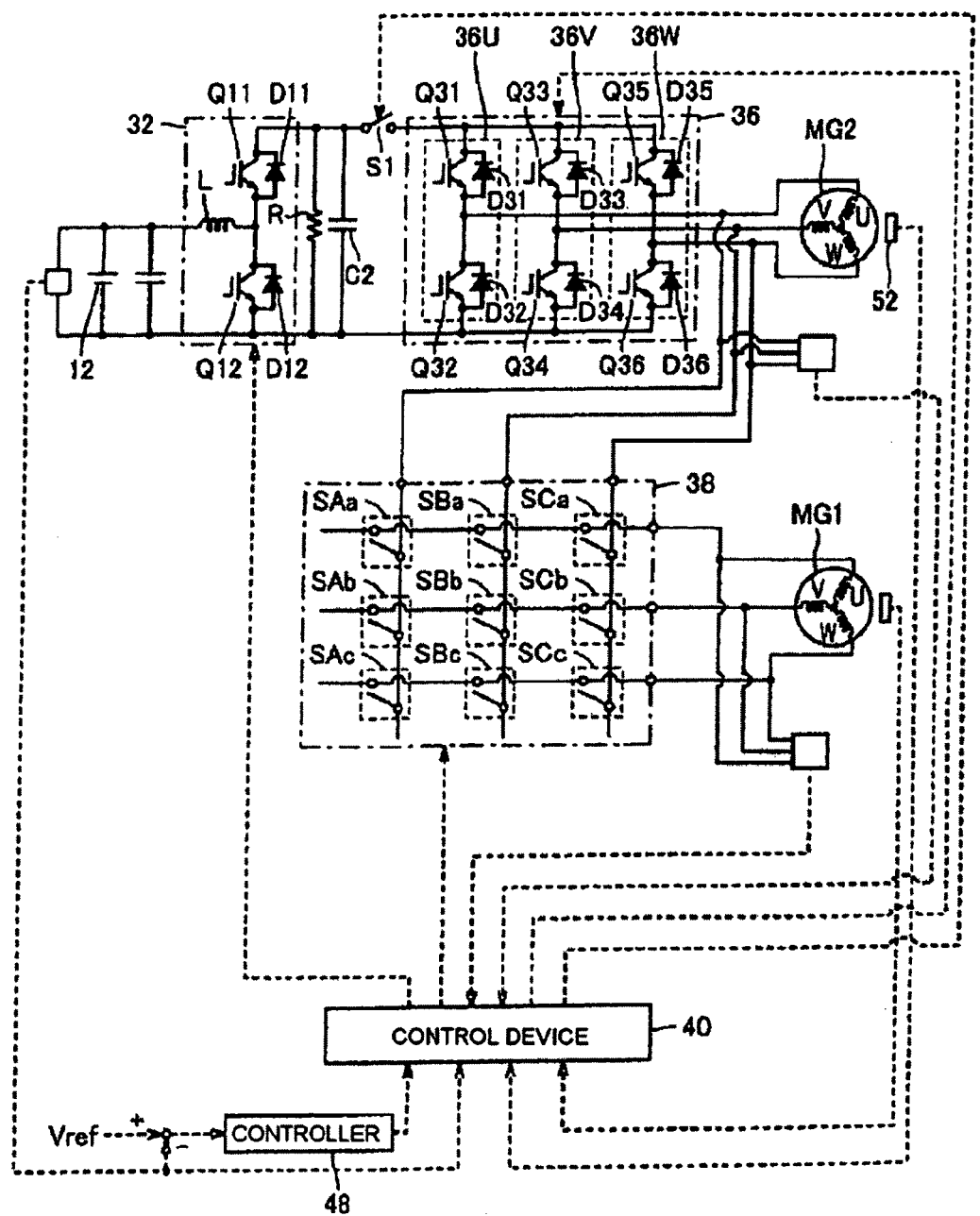
FIG. 8 is a circuit configuration diagram showing an example of the prior art.

FIG. 7 shows an applied example of FIG. 1. In the applied example, an internal combustion engine 13 is added to FIG. 1. The internal combustion engine 13 is mechanically connected to an AC power generator 1a. A wheel 15 is mechanically connected to an output shaft of the AC motor 3 through a gear 14. Thus, an electric car driving circuit is provided. Incidentally, it is a matter of course that the internal combustion engine 13 can be also applied to the circuits shown in FIGS. 4, 5 and 7.

With this configuration, the matrix converter 2 can perform power conversion of AC power output from the AC power generator 1a to drive the AC motor 3 to thereby drive an electric car.

Further, in the applied example shown in FIG. 7, the power conversion circuit 5 can perform power conversion of DC power output from the storage battery 4 to drive the AC motor 3 to thereby drive the electric car.

For driving the electric car, modes such as a mode for driving the AC motor 3 based on the output of the matrix converter 2 while turning off the respective switches of the power conversion circuit 5, a mode for driving the AC motor based on the output of the power conversion circuit 5 while turning off the respective switches of the matrix converter 2, a mode for driving the AC motor 3 based on time-division control of the matrix converter 2 and the power conversion circuit 5, and a mode for charging the storage battery 4 with electric power regenerated from the AC motor 3 in accordance with braking of the electric car can be switched one after another in accordance with the operating state of the electric car.

It will of course be appreciated by those skilled in the art that the invention may be practiced otherwise than as described herein without departing from the scope of the invention.

What is claimed is:

1. An AC motor driving circuit for driving an AC motor from an AC power supply and a DC power supply, which is configured to feed and absorb electric power, the AC motor driving circuit comprising:
a matrix converter configured to perform power conversion between the AC power supply and the AC motor, the matrix converter being connected between an output of the AC power supply and an input of the AC motor;
a power conversion circuit configured to perform power conversion between the DC power supply and the AC motor, the power conversion circuit including a plurality of series connection circuits in each of which a unidirectional switch is connected back-to-back with a diode, and a first bidirectional switch is connected in series with the unidirectional switch, a junction between each unidirectional switch and the respective first bidirectional switch being connected to an input phase of the AC motor, a terminal of each unidirectional switch not connected to the respective first bidirectional switch being connected to a first terminal of the DC power supply, and a terminal of each first bidirectional switch not connected to the respective unidirectional switch being connected to a second terminal of the DC power supply.

2. The AC motor driving circuit according to claim 1, wherein a number of the series connection circuits is the same as a number of the input phases of the AC motor.

3. An electric car driving circuit comprising the AC motor driving circuit according to claim 1, wherein the AC power supply is an AC power generator driven by an internal combustion engine.

4. The AC motor driving circuit according to claim 1, further comprising means for turning off the first bidirectional switches in the power conversion circuit when the matrix converter is operated.

5. The AC motor driving circuit according to claim 4, the matrix converter further comprising second bidirectional switches, wherein one terminal of each of the second bidirectional switches is connected to one of the input phases of the AC motor, and wherein the AC motor driving circuit further comprises means for turning off the second bidirectional switches when the power conversion circuit is operated.

6. The AC motor driving circuit according to claim 5, wherein the DC power supply is charged with electric power regenerated from the AC motor, while the second bidirectional switches in the matrix converter are turned off.

7. The AC motor driving circuit according to claim 5, wherein a first period in which the matrix converter performs power conversion between the AC power supply and the AC motor and a second period in which the power conversion circuit performs power conversion between the DC power supply and the AC motor are controlled in such a time division manner that the unidirectional switches and the first bidirectional switches in the power conversion circuit are turned off during the first period while the second bidirectional switches in the matrix converter are turned off during the second period.

8. The AC motor driving circuit according to claim 7, wherein the first period and second period are controlled using a PWM (Pulse Width Modulation) signal generating circuit.

9. An AC motor driving circuit for driving an AC motor, comprising:
an AC power supply;
a DC power supply configured to feed and absorb electric power;
a matrix converter configured to perform power conversion between the AC power supply and the AC motor, the matrix converter being connected between an output of the AC power supply and an input of the AC motor; and
a power conversion circuit configured to perform power conversion between the DC power supply and the AC motor, the power conversion circuit including a plurality of series connection circuits in each of which a unidirectional switch is connected back-to-back to a diode, and a first bidirectional switch is connected in series with the unidirectional switch, a junction between the unidirectional switch and the respective first bidirectional switch being connected to an input phase of the AC motor, a terminal of each unidirectional switch not connected to the respective first bidirectional switch being connected to a first terminal of the DC power supply, and a terminal of each first bidirectional switch not connected to the respective unidirectional switch being connected to a second terminal of the DC power supply.

10. The AC motor driving circuit according to claim 9, wherein a number of the series connection circuits is the same as a number of the input phases of the AC motor.

11. An electric car driving circuit comprising
the AC motor driving circuit according to claim 9, wherein the AC power supply is an AC power generator driven by an internal combustion engine.

12. The AC motor driving circuit according to claim 9, further comprising means for turning off the first bidirectional switches in the power conversion circuit when the matrix converter is operated.

13. The AC motor driving circuit according to claim 12, the matrix converter further comprising second bidirectional switches, wherein one terminal of each of the second bidirectional switches is connected to one of the input phases of the AC motor, and wherein the AC motor driving circuit further comprises means for turning off the second bidirectional switches when the power conversion circuit is operated.

14. The AC motor driving circuit according to claim 13, wherein the DC power supply is charged with electric power regenerated from the AC motor, while the second bidirectional switches in the matrix converter are turned off.

15. The AC motor driving circuit according to claim 13, wherein a first period in which the matrix converter performs power conversion between the AC power supply and the AC motor and a second period in which the power conversion circuit performs power conversion between the DC power supply and the AC motor are controlled in such a time division manner that the switches and the first bidirectional switches in the power conversion circuit are turned off during the first period while the second bidirectional switches in the matrix converter are turned off during the second period.

16. The AC motor driving circuit according to claim 15, wherein the first period and second period are controlled using a PWM (Pulse Width Modulation) signal generating circuit.

* * * * *